(No Model.)
F. M. BEAVER.
DOUBLETREE.
No. 530,573.  Patented Dec. 11, 1894.
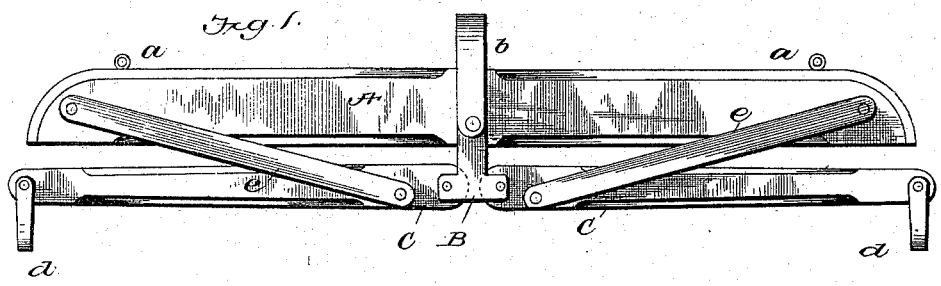
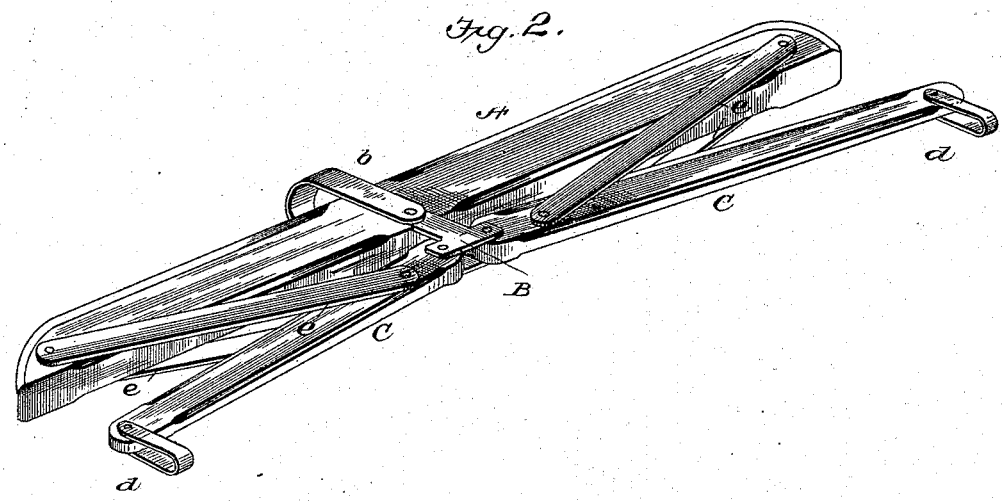
Witnesses
John Jamine
A. J. Birney.
Inventor
Francis M. Beaver
by
J F Beale  Attorney

UNITED STATES PATENT OFFICE.

FRANCIS MARION BEAVER, OF PLEASANT VALLEY, TEXAS, ASSIGNOR OF ONE-HALF TO JESSE HENRY GRIFFIN, OF SAME PLACE.

DOUBLETREE.

SPECIFICATION forming part of Letters Patent No. 530,573, dated December 11, 1894.

Application filed November 2, 1893. Serial No. 489,888. (No model.)

*To all whom it may concern:*

Be it known that I, FRANCIS MARION BEAVER, a citizen of the United States, residing at Pleasant Valley, in the county of Dallas and State of Texas, have invented certain new and useful Improvements in Doubletrees; and I do hereby declare the following to be a full, clear, and exact description of the invention, such as will enable others skilled in the art to which it appertains to make and use the same.

This invention relates to double trees, and it has for its object to provide a simple, comparatively inexpensive and durable device adapted to utilize the full force of the strain, exerted by each animal by throwing the same on the load instead of partly on each other or on the weaker animal, and it consists of the parts and combinations of parts hereinafter described and claimed.

In the accompanying drawings forming a part of this specification—Figure 1 is a plan view of my improved double tree, and Fig. 2 a perspective view of the same showing the position it assumes when in use.

Similar letters refer to similar parts in both views.

A represents a bar of the length and general size of an ordinary double tree which is provided with loops or eyes $a$ at each end whereby the bar may be connected to hooks in front of the fore-axle of a vehicle so as to limit the sway of the bar. At the center of the bar a loop or clevis $b$ is secured whereby the bar may be connected with a plow or other tool by a chain or hook or to a tongue of a vehicle. On the top and bottom of the opposite or front side of the bar, at the center of the same, is pivotally secured the T-shaped links B by means of the pin or bolt which secures the clevis to said bar or by an independent bolt or pin if desired. To and between the outer ends of the links B is pivoted the ends of two auxiliary bars C the abutting ends of which are rounded off so as to have a free movement past each other when the outer or free ends of the bars are moved in a horizontal plane, each of said bars, at its free end being provided with a clevis or hook $d$ to which the single trees are attached when the device is in use. At a point a short distance from the inner or abutting ends of the bars C and preferably slightly in advance of a line drawn lengthwise the bars through the pins connecting the link and said bars, I pivotally secure the ends of the bars $e$ the other ends of said bars $e$ being pivotally secured to the bar A at each end thereof. The bars $e$, as clearly shown, are four in number and are arranged in pairs, one pair at each side of the bar and connecting the inner ends of the bars C with the ends of the bar A. By means of the T-shaped link, the abutting ends of the bars C are pivotally connected to each other, and to the center of the main bar, the pivotal points being arranged at the corners of a triangle.

From the above description it will be understood that when strain is applied to the outer end of either or both of the bars C, by the animals attached thereto by the single trees, it is immediately transferred to the link and, through the bars $e$ to the end of the bar A, thus preventing the strain exerted by one of the animals, if greater than that exerted by the other, being transferred directly through the bar A to the other animal as is the case with the ordinary double tree.

By my device the strain exerted by each animal is confined to that half of the bar A on which it is exerted and the main draft is, through the link, exerted at the center of the bar A, thereby enabling the animals to move a heavier load while the bars $e$ serve to connect them with the ends of the bar A and thus utilize any surplus force of either animal in moving the load instead of throwing the same on the other animal.

In the event of one of the horses starting before the other, the auxiliary bar to which the slow horse is connected is gradually drawn back against the main bar, thereby enabling the slow horse to start before the other horse has time to force back the end of the main bar. After both animals are moving, should one of them pull up ahead of the other, such action does not affect the other animal, as the strain or draft is exerted on the center pin, and the auxiliary bar to which the other horse is attached is merely forced back slowly and without the sudden jerk incident to such action with the ordinary double tree.

Having thus described my invention, what

I claim as new, and desire to secure by Letters Patent, is—

A double tree, comprising the main bar adapted to be connected at each end to a vehicle, the T-shaped link pivotally secured to the center of said bar, the auxiliary bars pivotally connected at their abutting ends to each other and to the center of the main bar by said link, the bar *e* pivotally attached at one end to the inner ends of the auxiliary bars and at the other end to the ends of the main bar, substantially as shown and for the purposes described.

In testimony whereof I affix my signature in presence of two witnesses.

FRANCIS MARION $\overset{\text{his}}{\times}$ BEAVER.
mark

Witnesses:
   H. M. RAYEALE,
   J. H. BAKER.